May 25, 1965
J. A. BUCKNER
3,185,330
VEHICLE TRAILER SPRING SUSPENSION, LOAD SPRING
SUSPENSION, AND FRAME RAISING
AND LOWERING MEANS
Filed May 15, 1962
2 Sheets-Sheet 1
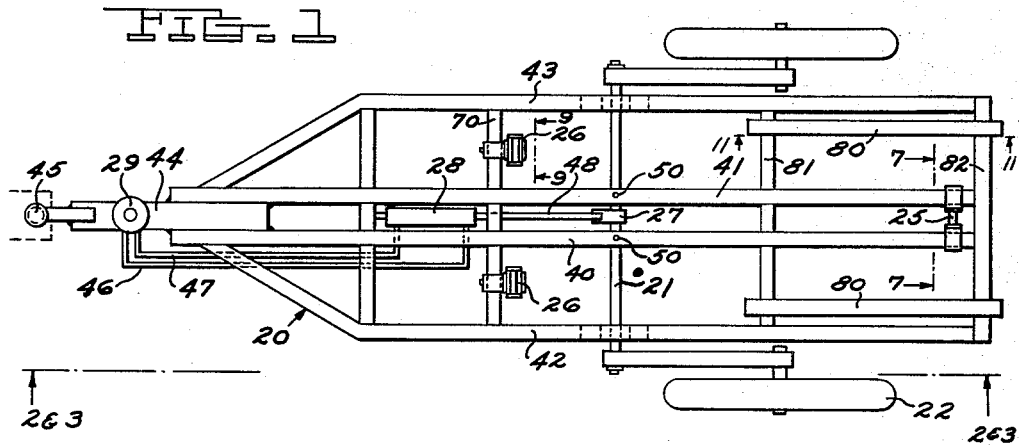
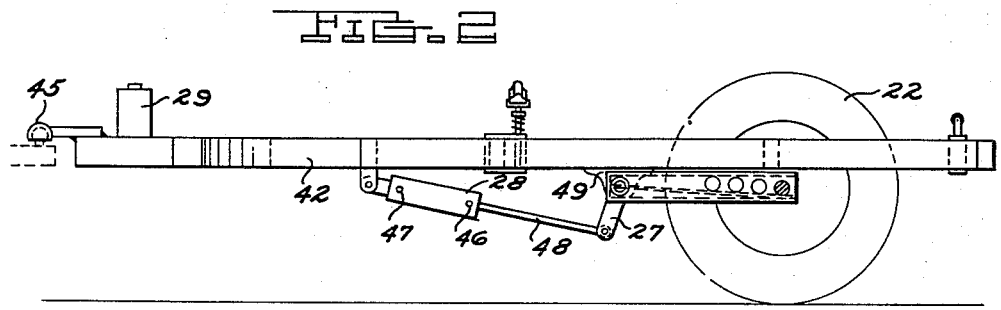
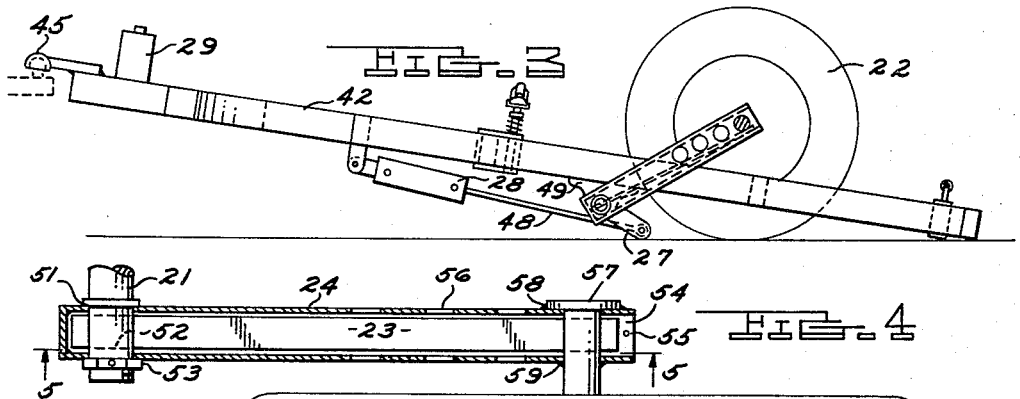
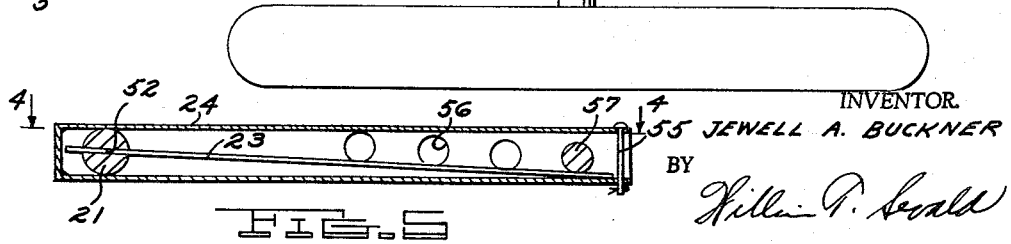
INVENTOR.
JEWELL A. BUCKNER
BY
ATTORNEY

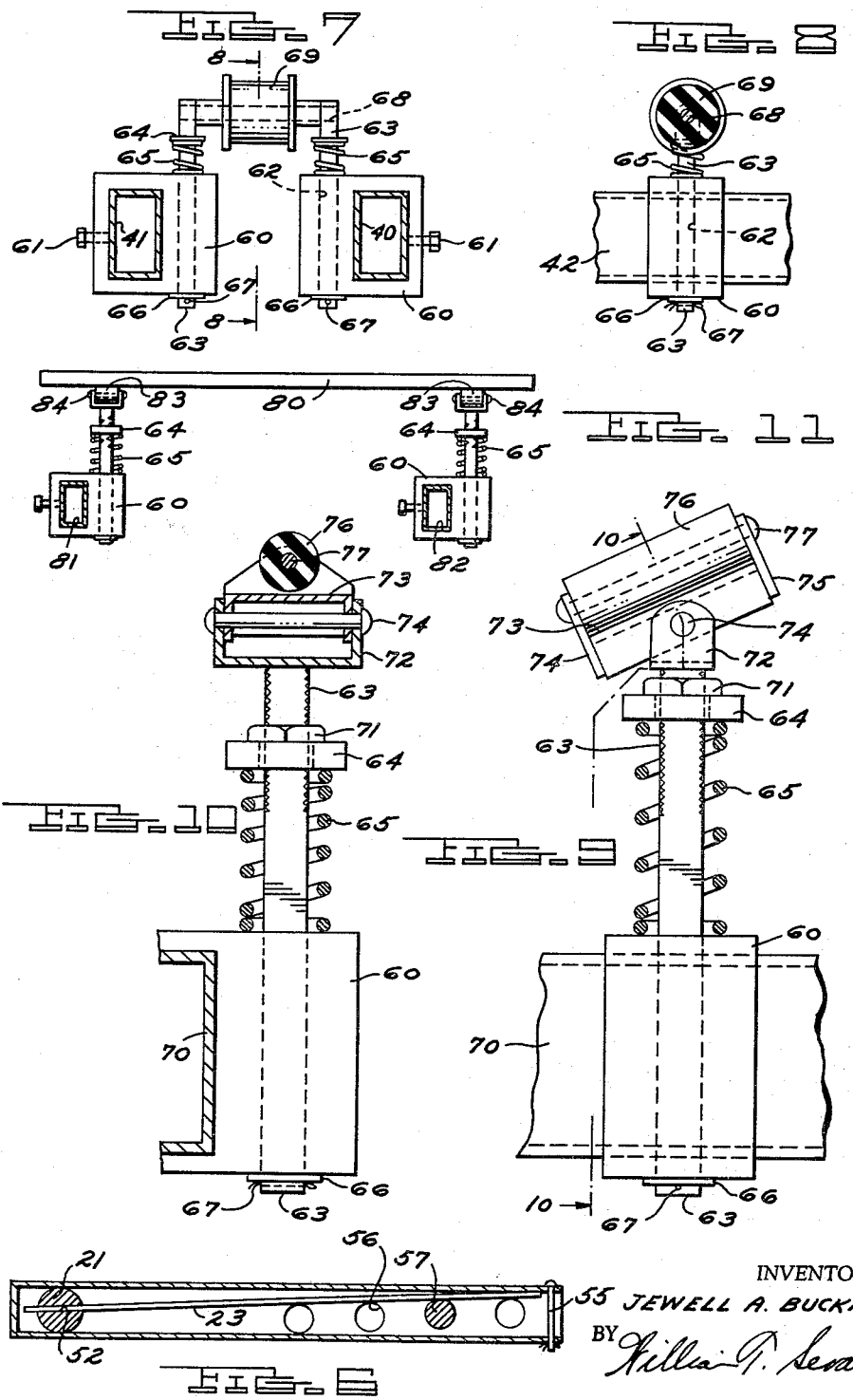

United States Patent Office 3,185,330
Patented May 25, 1965

3,185,330
VEHICLE TRAILER SPRING SUSPENSION, LOAD SPRING SUSPENSION, AND FRAME RAISING AND LOWERING MEANS
Jewell A. Buckner, Royal Oak, Mich.
Filed May 15, 1962, Ser. No. 194,898
4 Claims. (Cl. 214—506)

This invention relates to vehicle trailer construction, spring suspensions for wheels, and spring suspensions for loads. The invention further pertains to means for raising and lowering the trailer frame through the wheel spring suspensions. The invention is particularly suited to boat trailers.

Various types of trailers have been developed in the prior art for handling, supporting, and hauling heavy loads conveniently. However, the several devices of the prior art have not proven entirely satisfactory as they are complicated in design and construction, expensive to manufacture, difficult to use, and do not provide spring suspensions for the ground wheels or for the load relative to the trailer frame.

With the foregoing in view, the primary object of the invention is to provide a trailer which is suitable for handling, supporting, and hauling heavy loads which is simple in design and construction, inexpensive to manufacture, easy to use, and which provides spring suspensions relative to the ground wheels and also relative to the load carried on the trailer frame.

An object of the invention is to provide a trailer frame having a torque shaft across the frame which co-operates with leaf springs to resiliently support the frame and wheels relative to one another against forces causing angular movements.

An object of the invention is to provide a hollow caster arm on the torque shaft housing the leaf spring and supporting the frame and ground wheels relative to one another against forces transverse to angular forces to stabilize the wheels and frame relative to one another.

An object of the invention is to provide a trailer frame having beams and slidably adjustable blocks on the beams positioning spring means for resiliently supporting a load.

An object of the invention is to provide adjustment in the load supporting spring means for varying the force of the spring means relative to the load carried.

An object of the invention is to provide a crank arm on the torque shaft operated by power means for turning the torque shaft relative to the ground wheels for raising and lowering the frame relative to the ground by swinging the spring leaves and caster arms between the wheels and frame.

These and other objects of the invention will become apparent by reference to the following description of a boat trailer embodying the invention taken in connection with the accompanying drawings in which:

FIG. 1 is a top plan view of a boat trailer embodying the invention.

FIG. 2 is a side elevational view of the device seen in FIG. 1 with the frame elevated in the travel position.

FIG. 3 is a view similar to FIG. 2 with the frame lowered to the loading and unloading position.

FIG. 4 is a greatly enlarged cross-sectional view of the caster arm, leaf spring, torque shaft, and stub axle taken on the line 4—4 of FIG. 5.

FIG. 5 is a cross-sectional view of FIG. 4 taken on the line 5—5 thereof.

FIG. 6 is a view similar to FIG. 5, somewhat reduced in size, showing an alternate disposition of the spring leaf.

FIG. 7 is an enlarged partial cross-sectional view of FIG. 1 taken on the line 7—7 thereof showing a spring suspension means for resiliently supporting a load on a trailer frame.

FIG. 8 is a cross-sectional view of FIG. 7 taken on the line 8—8 thereof.

FIG. 9 is a greatly enlarged elevational view of another spring load suspension means such as taken on the line 9—9 of FIG. 1.

FIG. 10 is a side elevational view of the device seen in FIG. 9 taken at the left side of FIG. 9 showing the head portion in cross-section on the line 10—10 thereof; and FIG. 11 is a cross-sectional view of FIG. 1 taken on the line 11—11 showing a load supporting spring suspension.

Referring now to the drawings, the trailer and spring suspension means disclosed therein to illustrate the invention comprises, a frame 20, a torque shaft 21 lying across the frame 20, and ground wheels 22 located rearwardly of the torque shaft 21. A leaf spring 23 lies between the torque shaft 21 and the ground wheels 22 resiliently supporting the frame 20 relative to forces causing angular movement between the frame 20 and the wheels 22. A caster arm 24 surrounds the leaf spring 23 and interconnects the torque shaft 21 and ground wheels 22 supporting them relative to one another against forces transverse to angularly directed forces.

Load supporting spring suspension assemblies 25 and 26 are mounted on the frame 20 for resiliently supporting a load above the frame 20. The assemblies 25 and 26 are linearly adjustably slidable on the frame 20; they are also adjustable as to spring load compression.

A crank lever 27 is connected on the torque shaft 21 and is powered by a cylinder 28 and a hand pump 29 to swing the torque shaft 21 and leaf springs 23 to move the trailer frame 20 relative to the ground wheels 22 between the positions illustrated in FIGS. 2 and 3.

More particularly the trailer frame 20 preferably includes longitudinal center beams 40 and 41 and longitudinal side beams 42 and 43. A tongue 44 is welded between the center beams 40 and 41 at their forward end. A hitch 45 is welded on the tongue 44. The hydraulic hand pump 29 is welded on the tongue 44 and communicates with the cylinder 28 via a line 46 and a line 47. The pump 29 has integral valve means not shown for controlling flow of the hydraulic fluid in the lines 46 and 47 to the cylinder 28 as desired. The cylinder 28 operates a piston rod 48 which in turn actuates the crank lever 27 on the torque shaft 21.

A bearing 49 on each longitudinal beam 40–43 houses the torque shaft 21 for rotational movement relative to the frame 20 and the ground wheels 22. A pin 50 is disposed through each center beam 40 and 41, bearings 49 thereon, and the torque shaft 21 preventing rotation of the torque shaft 21 in the travel position of FIG. 2. This permits the torque shaft 21 to torsionally flex endwise outwardly from the pins 50 in the travel position of FIG. 2. The pins 50 are removable for the purpose of permitting controlled rotation of the torque shaft 21 to raise and lower the trailer frame 20 relative to the ground wheels 22.

Each end of the torque shaft 21 is equipped with an annular boss 51 and a diametrical slot 52. The caster arm 24 is box-like in construction and is equipped with apertures in its side walls through which the torque shaft 21 ends extend. A nut 53 is threaded on the outer end of the torque shaft 21 securing the caster arm 24 against the boss 51. It is to be noted that the caster arm 24 is freely pivotally mounted relative to the torque shaft 21 as so far described.

The spring leaf 23 is inserted through the open end 54 of the caster arm 24 and extends through the diametrical slot 52 of the torque shaft 21. A pin 55 leading through the walls of the caster arm 24 prevents the spring leaf 23 moving outwardly through the open end 54 of the caster arm 24.

A series of paired apertures 56 may be formed in the caster arm 24. A stub axle 57 is positioned in a selected pair of apertures 56 as illustrated. The stub axle 57 is welded to the side walls of the caster arm 24 as at 58 and 59. The stub axle 57 rotatably supports the ground wheels 22 on the caster arms on either side of the frame 20.

It can now be seen that the frame 20 rests on the bearings 49 which bear downwardly on the torque shaft 21. The torque shaft 21 bears downwardly on the leaf springs 23. The torque shaft 21 diametrical slots 52 house the inner ends of the leaf springs 23. The leaf springs 23 extend outwardly from the torque shaft to outer ends. Frame 20 load is thereby transmitted to the outer end of the leaf springs 23. The leaf springs 23 angularly flex and the torque shaft 21 angularly twists resiliently supporting the frame 20 load.

The ground wheels 22 support the stub axles 57 which support the outer ends of the caster arms 24. The caster arms 24 at the stub axles 57 support the outer ends of the spring leaves 23 as seen in FIGS. 1–5. In the embodiment of FIG. 6, the stub axles 57 directly support the outer end of the leaf springs 23. In both instances the torque shaft 21 supports the inner end of the caster arms 24. In both instances the caster arms 24 inner ends are free to pivot angularly relative to the torque shaft 21, with leaf spring flexing and torque shaft twisting.

The caster arms 24 allows leaf spring angular movement between the frame 20 and wheels 22. The caster arms 24 resist any forces transverse to angular movement around the leaf springs between the stub axles and the torque shaft thereby securely mounting the wheels and the frame relative to one another.

With the spring leaf 23 disposed in the caster arm 24 and in the diametrical slot 52 of the torque shaft 21, the trailer frame 20 and wheels 22 are resiliently supported relative to one another.

Relative to the embodiment shown in FIGS. 1–5, the frame 20 bears downwardly on the torque shaft 21 and spring leaf 23. The leaf spring 23 bears downwardly on the caster arm 24. The ground wheels and stub axles bear upwardly on the caster arm 24 and leaf spring 23 thereby supporting the trailer frame 20 with the spring leaf 23 and torque shaft 21 providing a spring suspension with the springing movement being permitted by the free angular movement of the caster arm 24 relative to the torque shaft 21.

In the embodiment shown in FIG. 6 it will be noted that the stub axle 57 bears upwardly against the spring leaf 23. In this embodiment, FIG. 6, the load is transferred directly between the spring leaf 23 and the stub axle 27.

Referring now to the spring suspension means for resiliently supporting a load on the trailer frame, FIGS. 1, 7, and 8, paired blocks 60 are slidably positioned on the trailer frame longitudinal beams such as center beams 40 and 41. Each block 60 is provided with a clamping bolt 61 for clamping the block 60 in the longitudinally adjusted position relative to the beam. Each block 60 has a vertical slide channel 62 slidably housing the slide rods 63.

The channel 62 and the slide 63 may be round or square as desired. The rod 63 is threaded adjacent its upper end. A nut 64 is threaded on the slide rod 63 and a spring 65 is disposed between the nut 64 and the block 60. A washer 66 surrounds the lower end of the slide rod 63 and a cotter pin 67 extends through the slide rod 63 and abuts the washer 66 preventing upward movement of the slide rod 63.

The slide rod 63 is urged upwardly by the spring 65 bearing upwardly against the nut 64 and downwardly against the block 60. Tightening the nut 64 downwardly on the spring increases spring compression for making a stiffer support for supporting heavier loads. A pivot pin 68 is disposed between the upper ends of the paired slide rods 63 and a roller 69 is rotatably supported on the pin 68.

When a boat keel rests on the roller 69 it bears downwardly on both slide rods 63 and both springs 65 and blocks 60 as shown. The nut 64 may be adjusted up and down on the slide rod 63 to vary the compression and resilience of the springs relative to the load on the roller 69 such as a boat keel. The blocks 60 may be moved longitudinally and adjusted in the desired position by loosening the clamping bolts 61 and sliding the blocks 60 on the longitudinal beams 40 and 41. The blocks 60 may be secured in position by tightening the clamping bolts 61.

Referring now to the resilient boat supporting means illustrated in FIGS. 1, 9, and 10, the blocks 60 are adjustably slidably positioned on a cross beam 70 of the trailer frame or they may be positioned on a longitudinal beam if desired. The block 60, slide rod 63, nut 64, and spring 65 are integrated as in FIGS. 7 and 8. A lock nut 71 may be disposed on the slide rod 63 to secure the adjusting nut 64 fixedly in an adjusted position.

A yoke 72 is welded to the top of the slide rod 63 and an inverted channel member 73 is disposed in the yoke 72. A pivot pin 79 is disposed through the yoke 72 and channel member 73 pivotally mounting the channel member 73 on the yoke 72. End plates 74 and 75 are welded on the channel member 73 and extend upwardly of the channel member 73. The channel member and end plates constitute a clevis. A roller 76 is disposed between the end plates 74 and 75 and the pin 77 rotatably supports the roller 76 on the end plates 74 and 75.

With the resilient load support means of FIGS. 9 and 10 slidably mounted on the cross beam 70 in the position seen in FIG. 1, the blocks 60 may be moved sidewise to adjust the roller 76 to the proper location such as relative to the curving or slanting sides of a boat. The nuts 64 may be rotated up and down on the slide bars 63 to adjust the force of the spring 65 in supporting the roller 76 relative to the inclined boat side. The pivotal relation of the channel member 73 and roller 76 on the slide rod 63 allows it to conform to the angulation of the boat side and the roller turns relative to the boat side as the boat is moved on and off the trailer.

Referring now to the resilient load support means of FIGS. 1 and 11, a long pad 80 may lie parallel with the trailer longitudinal beams 42 and 43 and transverse to the trailer cross-beams 81 and 82. Paired blocks 60 slidably surround each cross-beam 81 and 82 under each pad 80. The blocks 60 are secured in adjusted position by lock bolts 61 engaging the cross-beams 81 and 82. The blocks each have a slide rod 63, a spring 65, a nut 64, and a yoke 72 as previously described. The pad 80 has paired cleats 83 lying in each yoke 72 and pivotally connected thereto by pins 84. The pad 80 is thereby tiltably supported at each end on the yokes 72 for side-to-side swinging movement relative to the trailer and to a load thereon such as a boat.

The pad 80 may be urged into supporting relationship to a load equally at both of its ends by adjusting the nut 64 on the slide rod 63 so as to equally load or compress the springs 65 at either end relative to the blocks 60. In this way load weight is equally distributed in the pad and load weight equally distributed to the springs 65, blocks 60, and cross-beams 81 and 82. More importantly, it equals support relative to the load and eliminates localized or point support on a load. This gives the load a large equally supporting bearing area. This is very important in supporting a boat on a trailer for travel.

As the pad 80 tilts sidewise, it may conform to the transverse angularity of a load bearing surface. As the blocks 60 are movable sidewise singly and in combination, the ends of the pad 80 may be adjusted sidewise relative to one another as well as the entire pad being adjustable sidewise.

In operation, the trailer is attached to a vehicle via hitch 45 and the operator removes the pins 50 from the torque shaft 21 and then positions the valve on the pump 29 to permit hydraulic fluid flow in the cylinder 28. The weight of the trailer causes the crank lever 27 to pull the piston rod 48 outwardly from the cylinder 28 allowing the trailer to drop slowly downwardly from the position of FIG. 2 to the position seen in FIG. 3. The trailer is now in the easy load position. A load, such as a boat, is then positioned relative to the roller 69 so that its keel lies thereon and the boat is then drawn on the trailer.

The boat rolls up the trailer on the rollers 69 and 76 with its keel on the rollers 69 and with its sides and bottom travelling on the rollers 76 until it is mounted on the frame. Then it may be secured by conventional means.

The operator then adjusts the valves on the hand pump 29 to force fluid to the cylinder 28. He then pumps the pump 29 forcing fluid to the cylinder 28 whereupon the piston rod 48 travels inwardly of the cylinder 28 pulling the crank lever 27 from the position of FIG. 3 to the position of FIG. 4 with consequent rotation of the torque shaft 21.

As the torque shaft turns with the crank lever 27 from the position of FIG. 3 to the position of FIG. 2 it swings the leaf springs 23 and caster arms 24 so that the trailer frame 20 is raised from the position of FIG. 3 to the position of FIG. 2. The pins 50 are then inserted in the bearings 49 and torque shaft 21.

After the boat or other load is hauled to the desired location, the user removes the pins 50 and adjusts the valve to release the fluid from the cylinder 28 whereupon the trailer frame 20 and load moves downwardly slowly as the fluid bleeds out of the cylinder 23 permitting the torque shaft 21 to move rotationally in the bearings 49 whereupon the torque shaft 21 and frame 20 drop from the position of FIG. 2 to the position of FIG. 3. The boat may then be unfastened and rolled down the rollers 76 and 69 off the trailer frame 20.

When the load such as a boat is on the trailer, the resilient load supporting means on the blocks 60 may be inspected for relative compression of the springs 63 and the nuts 64 adjusted to achieve equalized compression and loading of the springs 65. This equally resiliently supports the load on the trailer.

In trailing a loaded trailer behind the vehicle, the caster arms 24 and leaf springs 23 trail rearwardly of the torque shaft 21 placing the stub axles 51 in a castered position behind the torque shaft 21. Road shocks during travelling are thereby easily encountered by the ground wheels 22, leaf springs 23, torque arms 24, and torque shaft 21 to flex easily with the road shocks. The pins 50 securely fix the torque shaft 21 intermediate its ends allowing a twisting spring resilience in the torque shaft itself from the pins 50 outwardly towards the leaf springs 23.

The stub axles 57 may be placed in any of the paired spaced apertures 56 of the caster arms 24. By placing the stub axle 57 in an aperture 56 of the caster arm 24 close to the torque shaft 21, the leverage on the springs 23 is substantially reduced whereas positioning the stub axle 57 in a caster arm 24 aperture remote from the torque shaft 21 increases the leverage on the leaf spring 23.

In the embodiments of FIGS. 4 and 5 this leverage is divided between the stub axle 57, caster arm 24, and leaf spring 23. In the embodiment of FIG. 6 the leverage is directly related to the position of the stub axle in the caster arm 24 relative to the leaf spring 23.

By placing the stub axles 57 close to the torque shaft 21 a heavier load may be supported although the spring resilience will be stiffer. By placing the stub axle 57 remote from the torque shaft 21 a lighter load may be carried with greater resilience.

While only one embodiment of the invention has been shown and described in detail, it is obvious that many changes may be made in the size, shape and detail and arrangement of the various elements of the invention within the scope of the appended claims.

I claim:
1. A spring suspension particularly suitable for a trailed vehicle such as a boat trailer comprising
  a frame,
  a torque shaft lying transverse to said frame,
  bearings on said frame housing said torque shaft;
  said torque shaft having opposite ends; paired hollow caster arms having a first end freely pivotally mounted on each said torque shaft end; each said caster arm having a second projecting end;
  said torque shaft having diametrical slots within each said hollow caster arm;
  a spring leaf lying in each said hollow caster arm; each said spring leaf having a first end lying in each torque shaft diametrical slot; each said leaf spring having a second cantilevered end adjacent said caster arm extending end;
  a stub axle fixed through each said caster arm abutting said leaf spring,
  a ground wheel on each said stub axle
  and means intermediate said torque shaft ends preventing torque shaft rotation;
  said spring leaves extending from said torque shaft substantially horizontally rearwardly relative to said torque shaft and said frame;
  said wheels supporting said stub axle;
  said stub axles supporting said spring leaves cantilevered ends; said spring leaves resiliently supporting said torque shaft; said torque shaft supporting said frame; said caster arms freely pivoting on said torque shaft in conjunction with spring leaf flexing between vertical movements of said torque shaft and stub axles relative to one another; and said caster arms transversely supporting said stub axles on said torque shaft extending ends.

2. A spring suspension particularly suitable for a trailed vehicle such as a boat trailer comprising
  a frame,
  a torque shaft lying transverse to said frame,
  bearings on said frame housing said torque shaft;
    said torque shaft having opposite ends; paired hollow caster arms having a first end freely pivotally mounted on each said torque shaft end; each said caster arm having a second projecting end;
  said torque shaft having diametrical slots within each said hollow caster arm;
  a spring leaf lying in each said hollow caster arm; each said spring leaf having a first end lying in each said torque shaft diametrical slot; each said leaf spring having a second cantilevered end adjacent said caster arm extending end;
  a stub axle fixed through each said caster arm,
  a ground wheel on each said stub axle
  and means intermediate said torque shaft ends preventing torque shaft rotation;
  said spring leaves extending from said torque shaft substantially horizontally rearwardly relative to said torque shaft and said frame;
  said wheels supporting said stub axle;
  said stub axle supporting said caster arms extending ends, said caster arms extending ends supporting said spring leaves cantilevered ends; said spring leaves resiliently supporting said torque shaft; said torque shaft supporting said frame; said caster arms freely pivoting on said torque shaft in conjunction with spring leaf flexing between vertical movements of said torque shaft and stub axles relative to one another; and said caster arms transversely supporting said stub axles on said torque shaft extending ends.

3. A spring suspension particularly suitable for a trailed vehicle comprising
  a frame;

a torque shaft lying transverse to said frame,
a hollow caster arm having a first end freely pivotally mounted on said torque shaft; said caster arm having a second projecting end;
said torque arm having a diametrical slot within said hollow caster arm;
a spring leaf lying in said hollow caster arm having a first end lying in said torque shaft diametrical slot;
said spring leaf having a second cantilevered end adjacent said caster arm extending end;
means confining said spring leaf in said caster arm;
a stub axle fixed through each caster arm abutting said leaf spring,
a ground wheel on said stub axle,
and means preventing torque shaft rotation;
said spring leaf extending from said torque shaft substantially horizontally rearwardly relative to said torque shaft and said frame;
said wheel supporting said stub axle;
said stub axle supporting said spring leaf cantilevered end; said spring leaf resiliently supporting said torque shaft; said torque shaft supporting said frame; said caster arm freely pivoting on said torque shaft in conjunction with said spring leaf flexing between vertical movements of said torque shaft and stub axle relative to one another; said caster arm transversely supporting said stub axle on said torque shaft.

4. A spring suspension particularly suitable for a trailed vehicle comprising
a frame;
a torque shaft lying transverse to said frame,
a hollow caster arm having a first end freely pivotally mounted on said torque shaft; said caster arm having a second projecting end;
said torque arm having a diametrical slot within hollow caster arm;
a spring leaf lying in said hollow caster arm having a first end lying in said torque shaft diametrical slot;
said spring leaf having a second cantilevered end adjacent said caster arm extending end;
means confining said spring leaf in said caster arm;
a stub axle fixed through each said caster arm,
a ground wheel on said stub axle,
and means preventing torque shaft rotation;
said spring leaf extending from said torque shaft substantially horizontally rearwardly relative to said torque shaft and said frame;
said wheel supporting said stub axle; said stub axle supporting said caster arm; said caster arm supporting said spring leaf cantilevered end; said spring leaf resiliently supporting said torque shaft; said torque shaft supporting said frame; said caster arm freely pivoting on said torque shaft in conjunction with said spring leaf fllexing between vertical movements of said torque shaft and stub axle relative to one another; said caster arm transversely supporting said stub axle on said torque shaft.

References Cited by the Examiner

UNITED STATES PATENTS

| | | | |
|---|---|---|---|
| 2,784,424 | 3/57 | Southerland | 280—43.18 X |
| 2,793,774 | 5/57 | Lovegreen | 214—505 |
| 2,816,672 | 12/57 | Facchini | 214—84 |
| 2,818,188 | 12/57 | Hooten | 214—506 |
| 2,835,399 | 5/58 | Buchholz | 214—506 |
| 2,835,400 | 5/58 | Latzke | 280—43.23 X |
| 2,869,887 | 1/59 | Westberg | 280—43.23 |
| 2,876,922 | 3/59 | Holiday | 214—506 |
| 2,918,298 | 12/59 | Starr | 280—43.23 |
| 2,936,919 | 5/60 | Bowman | 214—505 |
| 2,948,423 | 8/60 | Capuano | 214—84 |
| 2,957,593 | 10/60 | Evans | 214—506 |

HUGO O. SCHULZ, *Primary Examiner.*
GERALD M. FORLENZA, *Examiner.*